(12) United States Patent
Matsumoto

(10) Patent No.: US 12,275,531 B2
(45) Date of Patent: Apr. 15, 2025

(54) CONTROL DEVICE FOR FLIGHT VEHICLE

(71) Applicant: HONDA MOTOR CO., LTD., Tokyo (JP)

(72) Inventor: Takeshi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 18/164,062

(22) Filed: Feb. 3, 2023

(65) Prior Publication Data
US 2023/0249839 A1    Aug. 10, 2023

(30) Foreign Application Priority Data
Feb. 8, 2022   (JP) ................................ 2022-017579

(51) Int. Cl.
| | | |
|---|---|---|
| B64D 31/00 | (2024.01) | |
| B60L 50/60 | (2019.01) | |
| B60L 53/00 | (2019.01) | |
| B60L 58/10 | (2019.01) | |
| B60L 58/13 | (2019.01) | |
| B64D 27/10 | (2006.01) | |
| B64D 27/24 | (2006.01) | |
| B64D 35/00 | (2006.01) | |
| H01M 10/48 | (2006.01) | |
| H02K 7/18 | (2006.01) | |
| B64D 27/02 | (2006.01) | |
| B64D 27/353 | (2024.01) | |
| H01M 10/42 | (2006.01) | |

(52) U.S. Cl.
CPC .............. *B64D 31/00* (2013.01); *B60L 50/60* (2019.02); *B60L 53/00* (2019.02); *B60L 58/10* (2019.02); *B60L 58/13* (2019.02); *B64D 27/10* (2013.01); *B64D 27/24* (2013.01); *B64D 35/00* (2013.01); *H01M 10/48* (2013.01); *H02K 7/1807* (2013.01); *B60L 2200/10* (2013.01); *B64D 27/026* (2024.01); *B64D 27/353* (2024.01); *H01M 2010/4278* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2011/0024555 A1* | 2/2011 | Kuhn, Jr. ............ | B64C 29/0033 244/17.11 |
| 2020/0148374 A1 | 5/2020 | Kawai | |
| 2022/0243670 A1* | 8/2022 | Park ...................... | B64D 31/06 |

FOREIGN PATENT DOCUMENTS

JP    2020-075649 A    5/2020

* cited by examiner

*Primary Examiner* — Tamara L Weber
(74) *Attorney, Agent, or Firm* — Rankin, Hill & Clark LLP

(57) ABSTRACT

A flight controller of a flight vehicle includes an electric motor control unit for controlling each of a plurality of electric motors, and in a case where the plurality of electric motors are driven by electric power stored in a battery or in a case where the battery is charged with electric power generated by a generator, the electric motor control unit controls the plurality of electric motors in accordance with the state of the battery.

8 Claims, 8 Drawing Sheets

CONTROL DEVICE FOR FLIGHT VEHICLE

CROSS-REFERENCE TO RELATED APPLICATIONS

This application is based upon and claims the benefit of priority from Japanese Patent Application No. 2022-017579 filed on Feb. 8, 2022, the contents of which are incorporated herein by reference.

BACKGROUND OF THE INVENTION

Field of the Invention

The present invention relates to a control device for a flight vehicle.

Description of the Related Art

JP 2020-075649 A discloses a flight vehicle. The flight vehicle includes a gas turbine, a generator, a battery, and an electric motor. The generator is driven by the gas turbine. The electric power generated by the generator is stored in the battery. The electric motor is driven by the electric power supplied from the battery. When the battery is fully charged, the electric motor is driven while the gas turbine is stopped.

SUMMARY OF THE INVENTION

The responsiveness of the actually output power of the gas turbine is relatively low with respect to the required output power. Therefore, in the technique disclosed in JP 2020-075649 A, there is a problem in that, when the electric power required by the electric motor rapidly increases, the electric power generated by the generator cannot be increased in a short time and the battery is overdischarged. In addition, there is a problem in that, when the electric power required by the electric motor rapidly decreases, the electric power generated by the generator cannot be reduced in a short time and the battery is overcharged.

An object of the present invention is to solve the above-mentioned problems.

According to an aspect of the present invention, provided is a control device for a flight vehicle, the flight vehicle including: a gas turbine including a compressor, and a turbine configured to rotate integrally with the compressor; a generator configured to be driven by the gas turbine; a battery configured to store electric power generated by the generator; and a plurality of electric motors configured to be driven by the electric power generated by the generator and the electric power stored in the battery, the control device comprising: a battery state acquisition unit configured to acquire a state of the battery; and an electric motor control unit configured to control each of the plurality of electric motors, wherein, in a case where the plurality of electric motors are driven by the electric power stored in the battery or in a case where the battery is charged with the electric power generated by the generator, the electric motor control unit controls the plurality of electric motors in accordance with the state of the battery.

According to the present invention, overdischarge and overcharge of a battery can be suppressed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Flight Vehicle]

Figure 1:
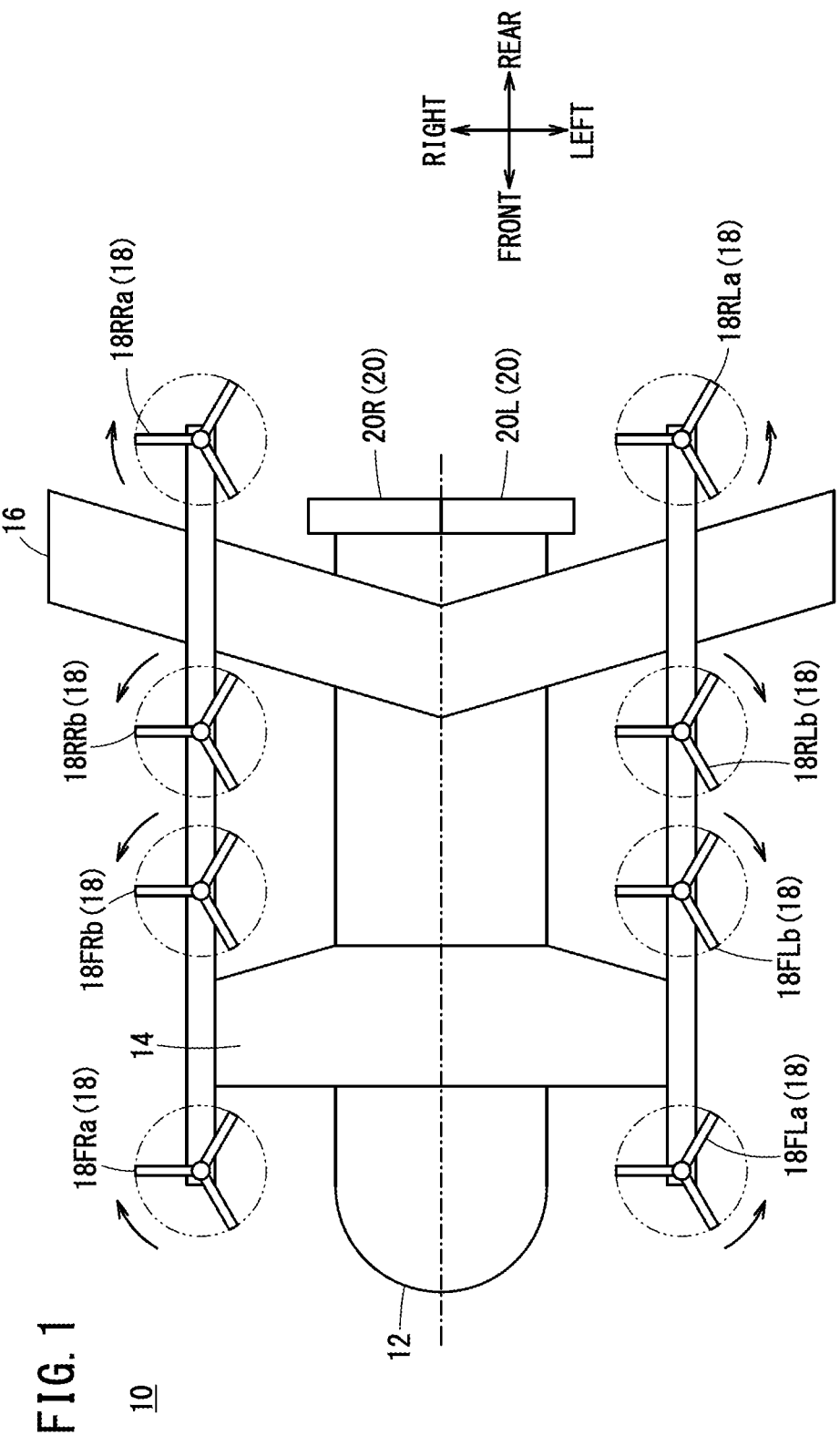
FIG. 1 is a schematic diagram of a flight vehicle.

FIG. 1 is a schematic diagram of a flight vehicle 10. The flight vehicle 10 of the present embodiment is an electric vertical take-off and landing aircraft (eVTOL aircraft). In the flight vehicle 10 of the present embodiment, rotors are driven by electric motors. The flight vehicle 10 of the present embodiment generates vertical thrust and horizontal thrust by using the rotors. Further, the flight vehicle 10 of the present embodiment is a hybrid aircraft. The flight vehicle 10 of the present embodiment includes a generator and a battery as power sources of the electric motor. In the flight vehicle 10 of the present embodiment, the electric power generated by the generator is normally supplied to the electric motor without passing through the battery. When the electric power generated by the generator is insufficient with respect to the electric power required by the electric motor, the electric power stored in the battery is supplied to the electric motor.

The flight vehicle 10 includes an airframe 12. The airframe 12 is provided with a cockpit, a cabin, and the like. A pilot gets in the cockpit, and the pilot controls the flight vehicle 10. Passengers and the like get in the cabin. The flight vehicle 10 may be automatically controlled without a pilot getting on the flight vehicle 10.

The flight vehicle 10 includes a front wing 14 and a rear wing 16. When the flight vehicle 10 moves forward, lift is generated in each of the front wing 14 and the rear wing 16.

The flight vehicle 10 includes eight VTOL rotors 18. The eight VTOL rotors 18 are a rotor 18FLa, a rotor 18FLb, a rotor 18RLa, a rotor 18RLb, a rotor 18FRa, a rotor 18FRb, a rotor 18RRa, and a rotor 18RRb. Each VTOL rotor 18 corresponds to a rotor of the present invention.

The rotation shaft of each VTOL rotor 18 extends in the vertical direction. The thrust of each VTOL rotor 18 is controlled by adjusting the rotational speed of the rotor and the pitch angle of the blades. Each VTOL rotor 18 is used during vertical take-off, during transition from vertical take-off to cruising, during transition from cruising to vertical landing, during vertical landing, during hovering, and the like. Further, each VTOL rotor 18 is used during attitude control.

Lift thrust is generated by controlling the thrust of each VTOL rotor 18. The lift thrust indicates thrust in a vertical direction. The thrust of each VTOL rotor 18 is controlled to cause a roll moment, a pitch moment, and a yaw moment to act on the airframe 12.

The flight vehicle 10 includes two cruise rotors 20. The two cruise rotors 20 are a rotor 20L and a rotor 20R. The rotor 20L and the rotor 20R are attached to the rear portion of the airframe 12. Each cruise rotor 20 corresponds to a rotor of the present invention.

The rotation shaft of each cruise rotor 20 extends in the front-rear direction. The thrust of each cruise rotor 20 is controlled by adjusting the rotational speed of the rotor and the pitch angle of the blades. Each cruise rotor 20 is used during transition from vertical take-off to cruising, during cruising, during transition from cruising to vertical landing, and the like.

Cruise thrust is generated by controlling the thrust of each cruise rotor 20. The cruise thrust indicates thrust in a horizontal direction.

[Configuration of Electric Power Supply System]

Figure 2:
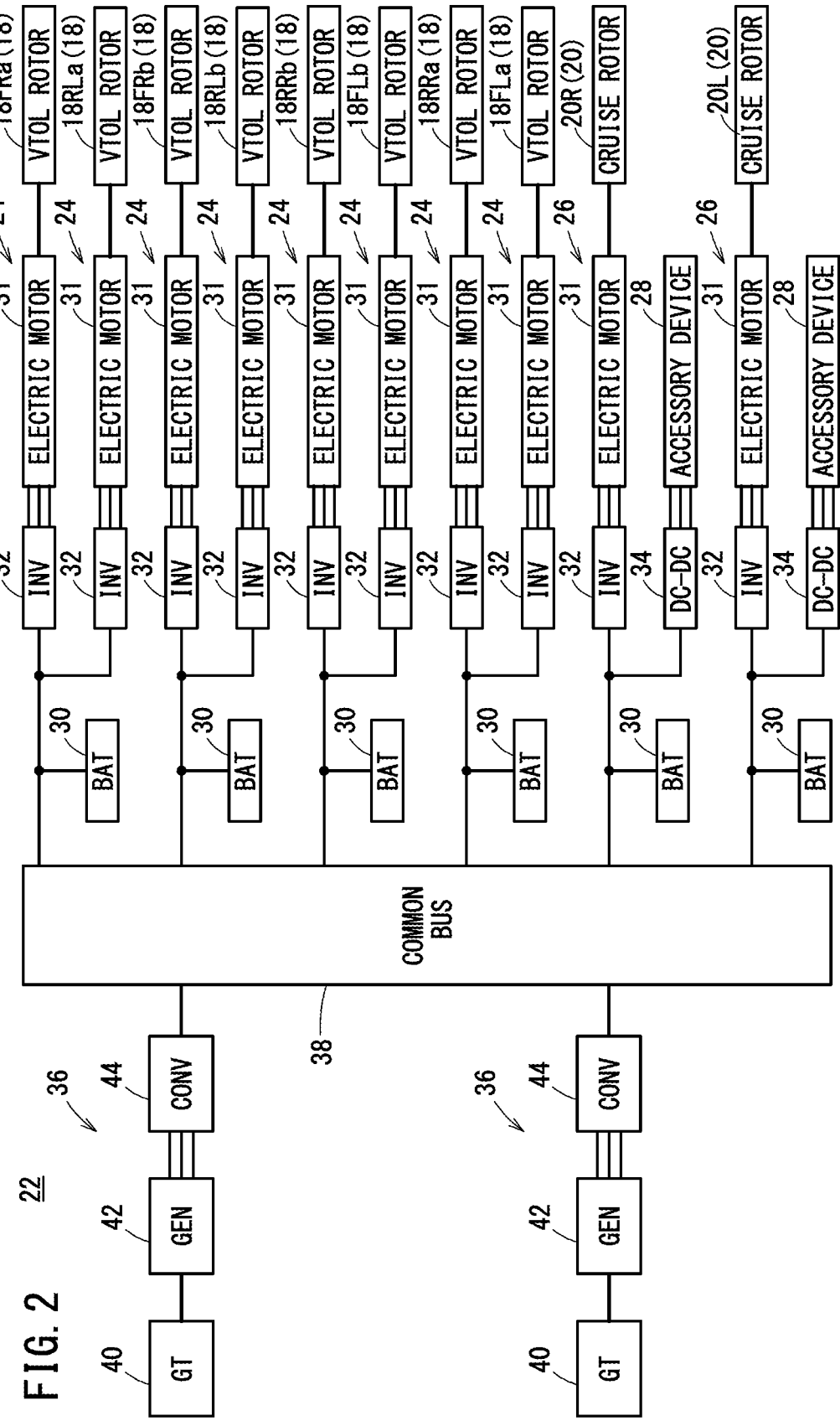
FIG. 2 is a schematic diagram showing a configuration of an electric power supply system.

FIG. 2 is a schematic diagram showing a configuration of an electric power supply system 22.

One set of VTOL drive unit 24 is provided for each VTOL rotor 18. Further, one set of cruise drive unit 26 is provided for each cruise rotor 20.

A plurality of accessory devices 28 are installed in the airframe 12. Two accessory devices 28 are installed in the airframe 12 of the present embodiment. One of the accessory devices 28 is an air-conditioning device that adjusts the temperature, humidity, and the like of the air inside the airframe 12. The other of the accessory devices 28 is, for example, a refrigerator for refrigerating food. Each accessory device 28 includes an electric motor.

One battery 30 is connected to two sets of the VTOL drive units 24. Further, one battery 30 is connected to one set of the cruise drive unit 26 and one accessory device 28.

The VTOL drive units 24 and the cruise drive units 26 each include an electric motor 31 and an inverter 32. The electric motor 31 is a three phase motor. An output shaft of the electric motor 31 is coupled to the rotation shaft of each VTOL rotor 18 or the rotation shaft of each cruise rotor 20. The electric motor 31 corresponds to a first electric motor of the present invention. The inverter 32 converts the input DC power into three phase AC power and outputs the three phase AC power to the electric motor 31.

Each accessory device 28 is connected to the battery 30 via a DC-DC converter 34. The DC-DC converter 34 steps down the voltage of the input DC power and outputs the stepped-down power to the accessory device 28.

The flight vehicle 10 includes two sets of electric power generation units 36. Each electric power generation unit 36 is connected to each VTOL drive unit 24, each cruise drive unit 26, and each accessory device 28 via a common bus 38. Each electric power generation unit 36 includes a gas turbine 40, a generator 42, and a converter 44.

Figure 3:
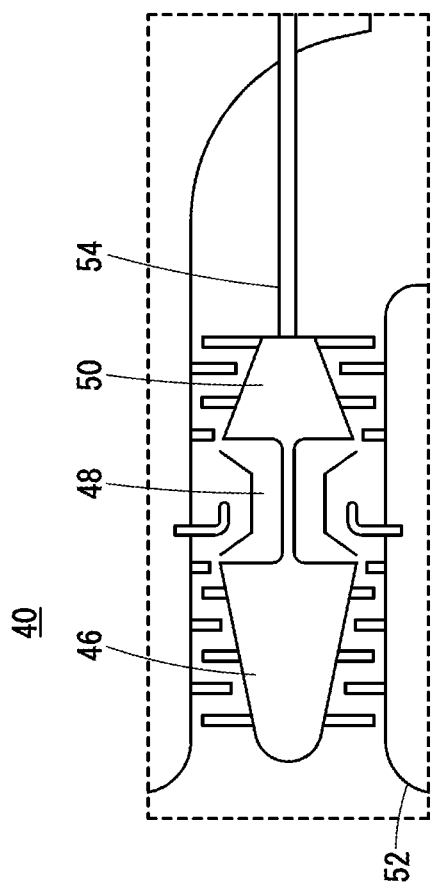
FIG. 3 is a schematic diagram of a gas turbine.

FIG. 3 is a schematic diagram of the gas turbine 40. The gas turbine 40 includes a compressor 46, a combustion chamber 48, and a turbine 50. Air sucked from an inlet 52 is compressed in the compressor 46. The compressed high pressure air is delivered to the combustion chamber 48. In the combustion chamber 48, fuel is injected to the high pressure air. As a result, the fuel is burned and high-temperature and high-pressure gas is generated. The turbine 50 is rotated by the gas. The energy of the high-temperature and high-pressure gas is converted to rotational energy by the turbine 50, and extracted by an output shaft 54. Part of this rotational energy is used to rotate the compressor 46.

The generator 42 is connected to the output shaft 54 of the gas turbine 40. The generator 42 is driven by the gas turbine 40 to generate electric power. The converter 44 converts the AC power generated by the generator 42 into DC power and outputs the DC power.

The electric motors 31 and the accessory devices 28 are driven by the electric power generated by the generators 42. The batteries 30 are charged with electric power generated by the generators 42. Further, the electric motors 31 and the accessory devices 28 are driven by the electric power stored in the batteries 30.

[Configuration of Control System]

Figure 4:
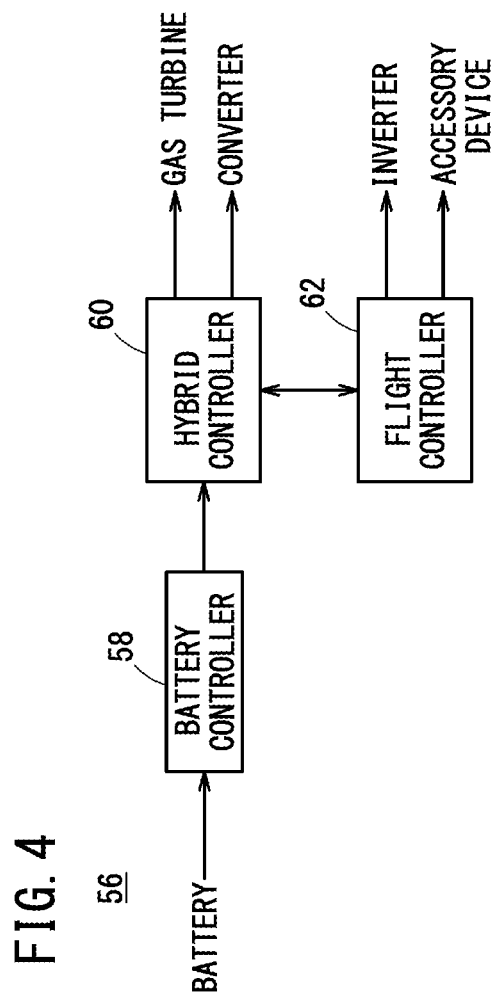
FIG. 4 is a schematic diagram showing a configuration of a control system.

FIG. 4 is a schematic diagram showing a configuration of a control system 56.

The control system 56 includes a battery controller 58, a hybrid controller 60, and a flight controller 62.

The battery controller 58 acquires a state of charge (SOC) of each battery 30. Based on the SOC of each battery 30, the battery controller 58 calculates the total amount of the input upper limit electric power and the total amount of the output upper limit electric power of the six batteries 30. When each battery 30 is charged, the electric power input to each battery 30 is set to be equal to or less than the input upper limit electric power, whereby overcharge of each battery 30 is suppressed. Further, when each battery 30 is discharged, the electric power output by each battery 30 is set to be equal to or less than the output upper limit electric power, whereby overdischarge of each battery 30 is suppressed.

Hereinafter, the term "input upper limit electric power" refers to the total amount of the input upper limit electric power of the six batteries 30. Further, the term "output upper limit electric power" refers to the total amount of the output upper limit electric power of the six batteries 30. Furthermore, the input upper limit electric power and the output upper limit electric power may be collectively referred to as input and output upper limit electric powers.

The hybrid controller 60 controls the output power of each gas turbine 40. The hybrid controller 60 controls the electric power generated by each generator 42. The electric power generated by the generator 42 is controlled by the converter 44 adjusting the load of electric power generation.

The flight controller 62 controls the output power of each electric motor 31. The flight controller 62 corresponds to a control device of the present invention. The output power of the electric motor 31 is adjusted by the inverter 32 adjusting the current supplied to the electric motor 31. The flight controller 62 drives or stops each accessory device 28.

Figure 5:
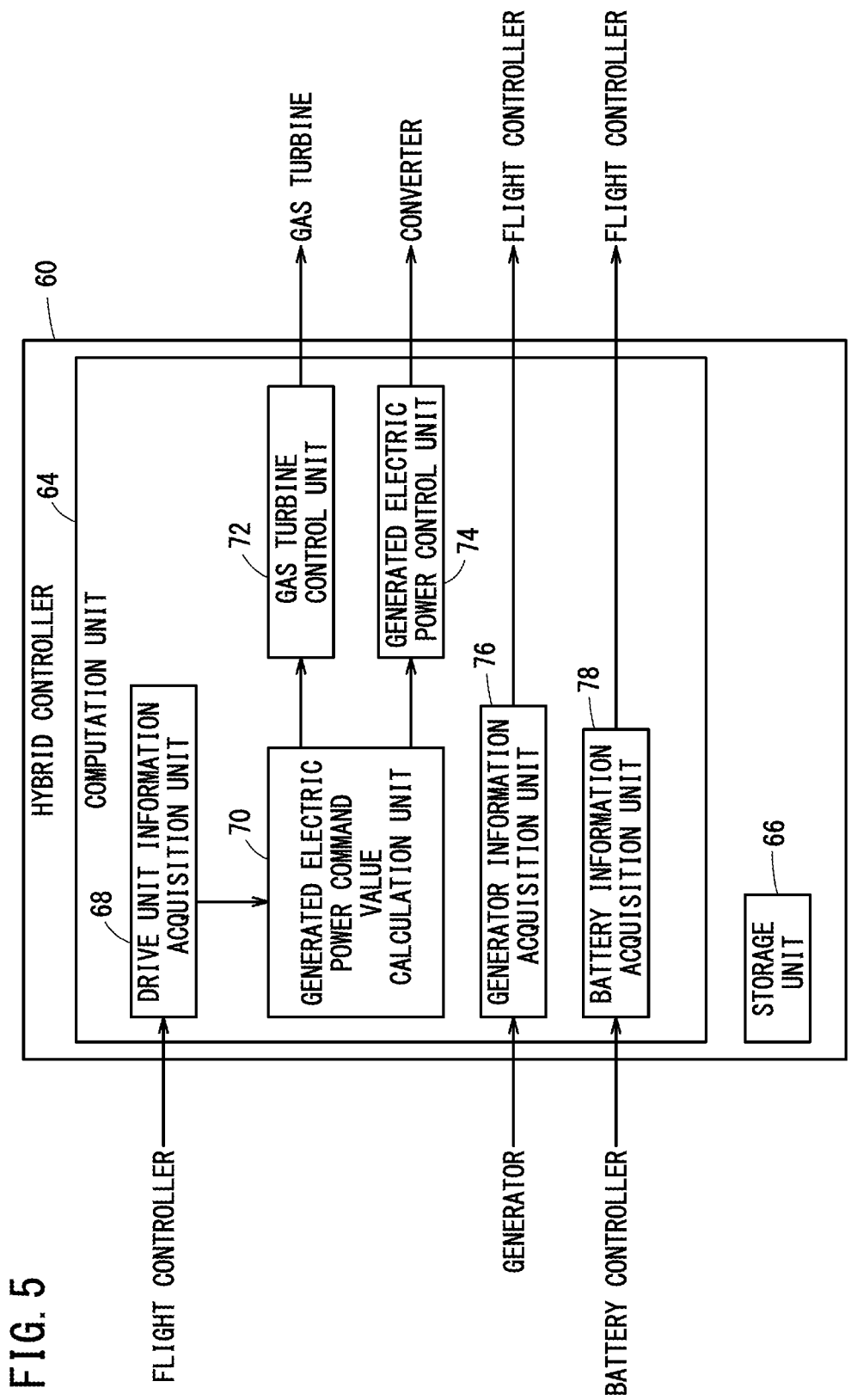
FIG. 5 is a control block diagram of a hybrid controller.

FIG. 5 is a control block diagram of the hybrid controller 60. The hybrid controller 60 includes a computation unit 64 and a storage unit 66. The computation unit 64 is, for example, a processor such as a central processing unit (CPU) or a graphics processing unit (GPU). The computation unit 64 includes a drive unit information acquisition unit 68, a generated electric power command value calculation unit 70, a gas turbine control unit 72, a generated electric power control unit 74, a generator information acquisition unit 76, and a battery information acquisition unit 78. The drive unit information acquisition unit 68, the generated electric power command value calculation unit 70, the gas turbine control unit 72, the generated electric power control unit 74, the generator information acquisition unit 76, and the battery information acquisition unit 78 are realized by the computation unit 64 executing programs stored in the storage unit 66. At least a part of the drive unit information acquisition unit 68, the generated electric power command value calculation unit 70, the gas turbine control unit 72, the generated electric power control unit 74, the generator information acquisition unit 76, and the battery information acquisition unit 78 may be realized by an integrated circuit such as an application specific integrated circuit (ASIC) or a field-programmable gate array (FPGA). At least a part of the drive unit information acquisition unit 68, the generated electric power command value calculation unit 70, the gas turbine control unit 72, the generated electric power control unit 74, the generator information acquisition unit 76, and the battery information acquisition unit 78 may be realized by an electronic circuit including a discrete device.

The storage unit 66 is configured by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least a part of the storage unit 66 may be included in the processor, the integrated circuit, or the like described above.

The drive unit information acquisition unit 68 acquires a required electric power from the flight controller 62. The required electric power will be described in detail later.

The generated electric power command value calculation unit 70 calculates a generated electric power command value according to the required electric power. The gas turbine control unit 72 controls the gas turbine 40 based on the generated electric power command value. The generated electric power control unit 74 controls the converter 44 based on the generated electric power command value.

The generator information acquisition unit 76 acquires, as actually generated electric power, the total amount of electric power generated by the generators 42. The battery information acquisition unit 78 acquires the input and output upper limit electric powers from the battery controller 58.

Figure 6:
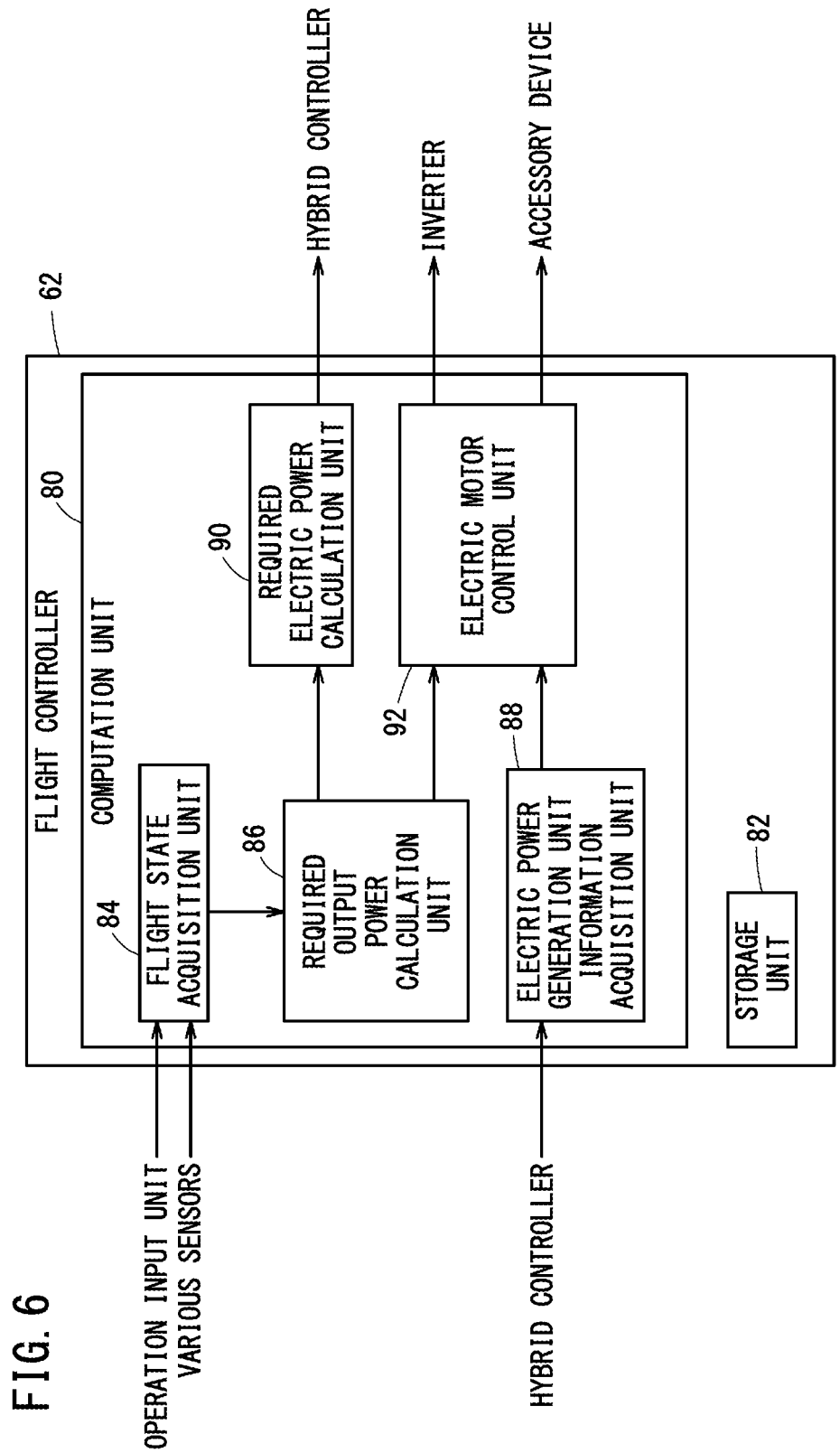
FIG. 6 is a control block diagram of a flight controller.

FIG. 6 is a control block diagram of the flight controller 62. The flight controller 62 includes a computation unit 80 and a storage unit 82. The computation unit 80 is, for example, a processor such as a central processing unit (CPU) or a graphics processing unit (GPU). The computation unit 80 includes a flight state acquisition unit 84, a required output power calculation unit 86, an electric power generation unit information acquisition unit 88, a required electric power calculation unit 90, and an electric motor control unit 92. The flight state acquisition unit 84, the required output power calculation unit 86, the electric power generation unit information acquisition unit 88, the required electric power calculation unit 90, and the electric motor control unit 92 are realized by the computation unit 80 executing programs stored in the storage unit 82. At least a part of the flight state acquisition unit 84, the required output power calculation unit 86, the electric power generation unit information acquisition unit 88, the required electric power calculation unit 90, and the electric motor control unit 92 may be realized by an integrated circuit such as an application specific integrated circuit (ASIC) or a field-programmable gate array (FPGA). At least a part of the flight state acquisition unit 84, the required output power calculation unit 86, the electric power generation unit information acquisition unit 88, the required electric power calculation unit 90, and the electric motor control unit 92 may be realized by an electronic circuit including a discrete device.

The storage unit 82 is configured by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least a part of the storage unit 82 may be included in the processor, the integrated circuit, or the like described above.

The flight state acquisition unit 84 acquires a flight state from an operation input unit, various sensors, and the like. The operation input unit is, for example, a control stick, a pedal, a lever, or the like operated by a pilot. The various sensors are, for example, an altitude sensor that detects an altitude of the airframe 12, an attitude angle sensor that detects a roll angle, a pitch angle, and a yaw angle of the airframe 12, and the like. The flight state indicates the operation amount of the operation input unit, the altitude of the airframe 12 detected by the altitude sensor, the attitude angle of the airframe 12 detected by the attitude angle sensor, and the like.

The required output power calculation unit 86 calculates required output power for each electric motor 31 based on the flight state.

The electric power generation unit information acquisition unit 88 acquires the input and output upper limit electric powers from the hybrid controller 60. The electric power generation unit information acquisition unit 88 corresponds to a battery state acquisition unit of the present invention.

The required electric power calculation unit 90 calculates required electric power based on the required output power for each electric motor 31. The required electric power is the total amount of the electric power required for the electric motors 31 to output the required output powers.

The electric motor control unit 92 determines electric power distributed to each electric motor 31 and each accessory device 28. The electric power distributed to each electric motor 31 and each accessory device 28 is determined based on the required output power for each electric motor 31, the actually generated electric power of the two generators 42, and the input and output upper limit electric powers of the six batteries 30.

[Electric Power Generation Control]

Figure 7:
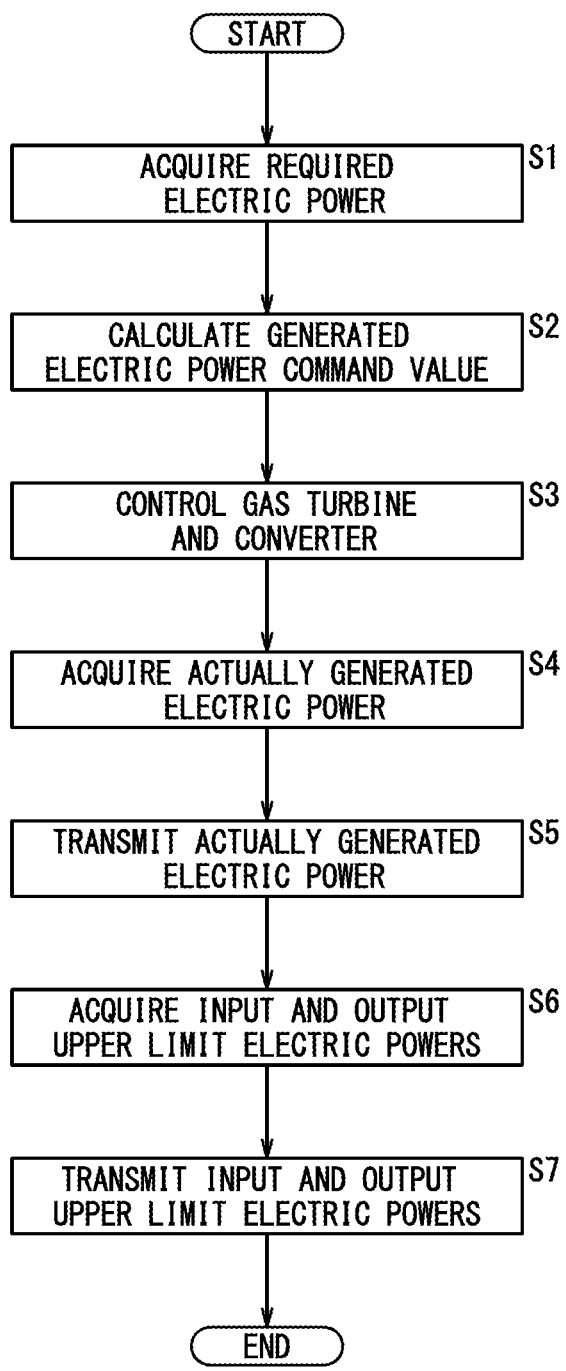
FIG. 7 is a flowchart showing an electric power generation control process executed by the hybrid controller.

FIG. 7 is a flowchart showing an electric power generation control process executed by the hybrid controller 60. The electric power generation control is repeatedly executed at a predetermined cycle while the gas turbine 40 is driven.

In step S1, the drive unit information acquisition unit 68 acquires the required electric power from the flight controller 62. Thereafter, the process proceeds to step S2.

In step S2, the generated electric power command value calculation unit 70 calculates a generated electric power command value according to the required electric power. Thereafter, the process proceeds to step S3.

In step S3, the gas turbine control unit 72 controls the gas turbine 40 based on the generated electric power command value. The generated electric power control unit 74 controls the converter 44 based on the generated electric power command value. Thereafter, the process proceeds to step S4.

In step S4, the generator information acquisition unit 76 acquires the actually generated electric power. Thereafter, the process proceeds to step S5.

In step S5, the generator information acquisition unit 76 transmits the actually generated electric power to the flight controller 62. Thereafter, the process proceeds to step S6.

In step S6, the battery information acquisition unit 78 acquires the input and output upper limit electric powers. Thereafter, the process proceeds to step S7.

In step S7, the battery information acquisition unit 78 transmits the input and output upper limit electric powers to the flight controller 62. Thereafter, the electric power generation control is ended.

[Drive Control]

Figure 8:
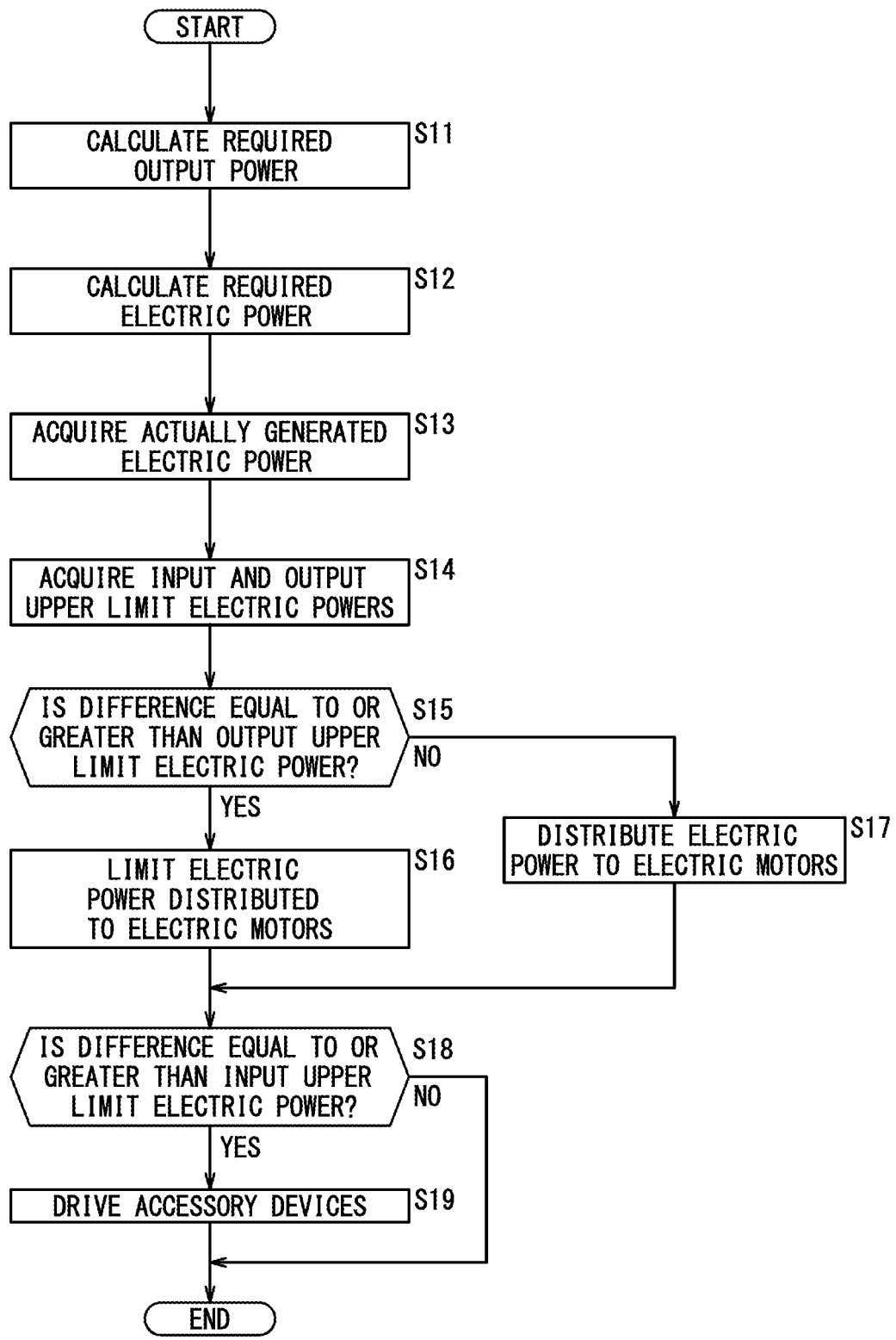
FIG. 8 is a flowchart showing a drive control process executed by the flight controller.

FIG. 8 is a flowchart showing a drive control process executed by the flight controller 62. The drive control is repeatedly executed at a predetermined cycle while the gas turbine 40 is driven.

In step S11, the required output power calculation unit 86 calculates required output power for each electric motor 31 based on the flight state. Thereafter, the process proceeds to step S12.

In step S12, the required electric power calculation unit 90 calculates required electric power based on the required output power for each electric motor 31. Thereafter, the process proceeds to step S13.

In step S13, the electric power generation unit information acquisition unit 88 acquires the actually generated electric power from the hybrid controller 60. Thereafter, the process proceeds to step S14.

In step S14, the electric power generation unit information acquisition unit 88 acquires the input and output upper limit electric powers from the hybrid controller 60. Thereafter, the process proceeds to step S15.

In step S15, the electric motor control unit 92 determines whether or not a difference obtained by subtracting the actually generated electric power from the required electric power is equal to or greater than the output upper limit electric power. When the difference is equal to or greater than the output upper limit electric power, it can be determined that the sum of the loads of the electric motors 31 is excessive relative to the actually generated electric power of the two generators 42. When the difference is equal to or greater than the output upper limit electric power, the process proceeds to step S16. When the difference is less than the output upper limit electric power, the process proceeds to step S17.

In step S16, the electric motor control unit 92 determines electric power distributed to each electric motor 31 based on the required output power of each electric motor 31. In this case, the total amount of the electric power distributed to the respective electric motors 31 is limited. That is, the total amount of the electric power distributed to the respective electric motors 31 is less than the required electric power.

In step S16, when the accessory devices 28 are being driven, the electric motor control unit 92 may stop the accessory devices 28. As a result, the electric power is distributed to the electric motors 31 in preference to the accessory devices 28.

In step S16, the electric motor control unit 92 may distribute electric power to the respective electric motors 31 by assigning priorities to the electric motors 31 in accordance with the flight state. This enables the flight vehicle 10 to fly in a state where the attitude of the airframe 12 is stabilized.

In step S17, the electric motor control unit 92 determines electric power distributed to each electric motor 31 based on the required output power of each electric motor 31. In this case, the total amount of the electric power distributed to the respective electric motors 31 is not limited. That is, the total amount of the electric power distributed to the respective electric motors 31 is the required electric power.

In step S18, the electric motor control unit 92 determines whether or not a difference obtained by subtracting the required electric power from the actually generated electric power is equal to or greater than the input upper limit electric power. When the difference is equal to or greater than the input upper limit electric power, it can be determined that the load of each electric motor 31 is excessively small relative to the actually generated electric power of the two generators 42. When the difference is equal to or greater than the input upper limit electric power, the process proceeds to step S19. When the difference is less than the input upper limit electric power, the drive control is ended.

In step S19, the electric motor control unit 92 drives the accessory devices 28. Thereafter, the drive control is ended.

Advantageous Effects

In order to improve the fuel consumption rate of each gas turbine 40, the gas turbine control unit 72 and the generated electric power control unit 74 change the rotational speed of each gas turbine 40 in accordance with the change in the output power of each gas turbine 40. The inertia of the rotating elements of each gas turbine 40 is relatively large. Therefore, the responsiveness of the actually output power of each gas turbine 40 is relatively low with respect to the required output power. The rotating elements of each gas turbine 40 are, for example, the compressor 46, the turbine 50, the output shaft 54, and the like. The responsiveness of the actually generated electric power of the generator 42, which is driven by the gas turbine 40, is also relatively low with respect to the required generated electric power.

Therefore, when the required output power of each electric motor 31 rapidly increases and the required electric power rapidly increases, the electric power generated by each generator 42 cannot respond to the increase in the required electric power. In such a case, by supplying electric power from each battery 30 to each electric motor 31, supply of electric power corresponding to the required electric power is ensured. However, when the increase amount of the required electric power is excessive, there is a possibility that each battery 30 is overdischarged.

In addition, when the required output power of each electric motor 31 rapidly decreases and the required electric power rapidly decreases, the electric power generated by each generator 42 cannot follow the decrease in the required electric power. In such a case, part of the electric power generated by each generator 42 is stored in each battery 30. However, when the decrease amount of the required electric power is excessive, there is a possibility that each battery 30 is overcharged.

In order to prevent the above-described overdischarge and overcharge of each battery 30, it is conceivable to increase the power storage capacity of each battery 30. However, when the power storage capacity of each battery 30 is increased, there is a problem that each battery 30 is increased in size.

In addition, in order to prevent the above-described overdischarge and overcharge of each battery 30, it is conceivable to provide a device (for example, a DC-DC converter) for preventing the overdischarge and overcharge for each battery 30. However, since a new device is added, the number of components of the electric power supply system 22 increases. As a result, there arise problems such as an increase in weight of the electric power supply system 22, an increase in manufacturing cost of the electric power supply system 22, and complication of the electric power supply system 22.

Therefore, in the flight controller 62 of the present embodiment, the electric motor control unit 92 controls each electric motor 31 according to the state of each battery 30. Specifically, when the difference obtained by subtracting the actually generated electric power from the required electric power is equal to or greater than the output upper limit electric power, the total amount of the electric power distributed to the respective electric motors 31 is limited. As a result, the electric power consumed by each electric motor 31 is reduced, thereby preventing each battery 30 from being overdischarged. When the difference obtained by subtracting the required electric power from the actually generated electric power is equal to or greater than the input upper limit electric power, each accessory device 28 is driven. As a result, electric power is consumed by each accessory device 28, thereby preventing each battery 30 from being overcharged.

In the flight controller 62 of the present embodiment, the electric motor control unit 92 distributes electric power to the respective electric motors 31 by assigning priorities to the electric motors 31 in accordance with the flight state. This enables the flight vehicle 10 to fly in a state where the attitude of the airframe 12 is stabilized.

In the flight controller 62 of the present embodiment, when the difference obtained by subtracting the actually generated electric power from the required electric power is equal to or greater than the output upper limit electric power and when the accessory devices 28 are being driven, the electric motor control unit 92 stops the accessory devices 28. As a result, the electric power is distributed to the electric motors 31 in preference to the accessory devices 28.

Note that the present invention is not limited to the above disclosure, and various modifications are possible without departing from the essence and gist of the present invention.

When the difference obtained by subtracting the required electric power from the actually generated electric power is equal to or larger than the input upper limit electric power, the electric motor control unit 92 may change the pitch angle of the blades of each VTOL rotor 18. As the pitch angle of the blades is changed, the thrust generated per rotation of each VTOL rotor 18 is changed. By reducing the thrust generated per rotation of each VTOL rotor 18, it is possible to increase power consumption of the electric motor 31 of each VTOL rotor 18. Similarly, the electric motor control unit 92 may change the pitch angle of the blades of each cruise rotor 20.

When the difference obtained by subtracting the required electric power from the actually generated electric power is equal to or greater than the input upper limit electric power, the electric motor control unit 92 may change the pitch angle of the blades in addition to driving each accessory device 28.

Further, an electric actuator may be used as an actuator for changing the pitch angle of the blades. By driving the actuator, electric power is consumed.

The flight vehicle 10 according to the first embodiment includes two electric power generation units 36. However, the flight vehicle 10 may include one electric power generation unit 36. Alternatively, the flight vehicle 10 may include three or more electric power generation units 36.

The flight vehicle 10 according to the first embodiment includes ten electric motors 31. However, the number of the electric motors 31 of the flight vehicle 10 may be less than ten. Alternatively, the number of the electric motors 31 of the flight vehicle 10 may be more than ten.

Invention Obtained from Embodiment

The invention that can be grasped from the above embodiment will be described below.

According to the present invention, provided is the control device (62) for the flight vehicle (10), the flight vehicle including: the gas turbine (40) including the compressor 46), and the turbine (50) configured to rotate integrally with the compressor; the generator (42) configured to be driven by the gas turbine; the battery (30) configured to store electric power generated by the generator; and the plurality of electric motors (31) configured to be driven by the electric power generated by the generator and the electric power stored in the battery, the control device including: the battery state acquisition unit (88) configured to acquire a state of the battery; and the electric motor control unit (92) configured to control each of the plurality of electric motors, wherein, in a case where the plurality of electric motors are driven by the electric power stored in the battery or in a case where the battery is charged with the electric power generated by the generator, the electric motor control unit controls the plurality of electric motors in accordance with the state of the battery. As a result, each battery is prevented from being overdischarged. In addition, each battery is prevented from being overcharged.

In the above-described control device for the flight vehicle, the control device may further include the flight state acquisition unit (84) configured to acquire a state of the flight vehicle, and the electric motor control unit may determine the electric power distributed to each of the plurality of electric motors based on the state of the battery and the state of the flight vehicle. This enables the flight vehicle to fly in a state where the attitude of the airframe is stabilized.

In the above-described control device for the flight vehicle, the plurality of electric motors may include at least one first electric motor (31) configured to drive at least one rotor (18, 20) configured to cause the flight vehicle to generate thrust. As a result, each battery is prevented from being overdischarged. In addition, each battery is prevented from being overcharged.

In the above-described control device for the flight vehicle, in a case where the load of the first electric motor becomes excessive relative to the electric power generated by the generator, the electric motor control unit may determine the electric power distributed to each of the plurality of electric motors in accordance with the state of the battery. As a result, each battery is prevented from being overdischarged.

In the above-described control device for the flight vehicle, in a case where the load of the first electric motor becomes excessively small relative to the electric power generated by the generator, the electric motor control unit may determine the electric power distributed to each of the plurality of electric motors in accordance with the state of the battery. As a result, each battery is prevented from being overcharged.

The invention claimed is:

1. A control device for a flight vehicle, the flight vehicle including:
    a gas turbine including a compressor, and a turbine configured to rotate integrally with the compressor;
    a generator configured to be driven by the gas turbine;
    a battery configured to store electric power generated by the generator; and
    a plurality of electric motors configured to be driven by the electric power generated by the generator and the electric power stored in the battery,
    the control device comprising one or more processors executing computer-executable instructions stored in memory, wherein
    the one or more processors execute the computer-executable instructions to cause the control device to:

calculate a required output power for each of the plurality of electric motors;
calculate a required electric power based on the required output power for each of the plurality of electric motors;
acquire an actually generated electric power, which is electric power generated by the generator;
calculate an output upper limit electric power of the battery based on a state of charge of the battery; and
distribute electric power to each of the plurality of electric motors in a manner so that a total amount of the electric power distributed to each of the electric motors is smaller than the required electric power in a case where a difference acquired by subtracting the actually generated electric power from the required electric power is equal to or greater than the output upper limit electric power.

2. The control device for the flight vehicle according to claim 1, wherein
the one or more processors execute the computer-executable instructions to cause the control device to determine electric power distributed to each of the plurality of electric motors based on a state of the battery and a state of the flight vehicle.

3. The control device for the flight vehicle according to claim 1, wherein
the plurality of electric motors include at least one first electric motor configured to drive at least one rotor configured to cause the flight vehicle to generate thrust.

4. The control device for the flight vehicle according to claim 3, wherein
in a case where a load of the first electric motor becomes excessive relative to the electric power generated by the generator the one or more processors execute the computer-executable instructions to cause the control device to determine electric power distributed to each of the plurality of electric motors in accordance with a state of the battery.

5. A control device for a flight vehicle, the flight vehicle including:
a gas turbine including a compressor and a turbine configured to rotate integrally with the compressor;
a generator configured to be driven by the gas turbine;
a battery configured to store electric power generated by the generator;
a plurality of electric motors configured to be driven by the electric power generated by the generator and the electric power stored in the battery; and
an accessory device configured to be driven by the electric power generated by the generator and the electric power stored in the battery,
the control device comprising one or more processors that executes computer-executable instructions stored in memory,
the one or more processors execute the computer-executable instructions to cause the control device to:
calculate a required output power for each of the plurality of electric motors;
calculate a required electric power based on the required output power for each of the plurality of electric motors;
acquire an actually generated electric power, which is electric power generated by the generator;
calculate an input upper limit electric power of the battery based on a state of charge of the battery; and
drive the accessory device in a case where a difference acquired by subtracting the required electric power from the actually generated electric power is equal to or greater than the input upper limit electric power.

6. The control device for the flight vehicle according to claim 5, wherein
the one or more processors execute the computer-executable instructions to cause the control device to determine electric power distributed to each of the plurality of electric motors based on a state of the battery and a state of the flight vehicle.

7. The control device for the flight vehicle according to claim 5, wherein
the plurality of electric motors include at least one first electric motor configured to drive at least one rotor configured to cause the flight vehicle to generate thrust.

8. The control device for the flight vehicle according to claim 7, wherein
in a case where a load of the first electric motor becomes excessively small relative to the electric power generated by the generator, the one or more processors execute the computer-executable instructions to cause the control device to determine electric power distributed to each of the plurality of electric motors in accordance with a state of the battery.

* * * * *